United States Patent
Kim et al.

(10) Patent No.: US 8,767,848 B2
(45) Date of Patent: Jul. 1, 2014

(54) CHANNEL ESTIMATION BASED ON LONG TRAINING SYMBOL WITH DOUBLED CYCLIC PREFIX

(75) Inventors: Taejoon Kim, Berkeley, CA (US); Timothy M. Schmidl, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 343 days.

(21) Appl. No.: 13/335,705

(22) Filed: Dec. 22, 2011

(65) Prior Publication Data

US 2012/0163497 A1 Jun. 28, 2012

Related U.S. Application Data

(60) Provisional application No. 61/426,668, filed on Dec. 23, 2010.

(51) Int. Cl.
| | | |
|---|---|---|
| *H04L 27/28* | (2006.01) | |
| *H04L 25/02* | (2006.01) | |
| *H04J 11/00* | (2006.01) | |
| *H04L 27/26* | (2006.01) | |
| *H04L 5/00* | (2006.01) | |

(52) U.S. Cl.
CPC .......... *H04J 11/0079* (2013.01); *H04L 27/262* (2013.01); *H04L 25/0226* (2013.01); *H04L 27/2675* (2013.01); *H04L 27/2613* (2013.01); *H04L 5/0044* (2013.01); *H04L 27/266* (2013.01); *H04L 27/2695* (2013.01)
USPC ........................................................ 375/260

(58) Field of Classification Search
CPC .............. H04L 5/0053; H04L 27/2602; H04L 27/2605; H04L 27/2607
USPC ........................................................ 375/260
See application file for complete search history.

(56) References Cited

U.S. PATENT DOCUMENTS

| | | | |
|---|---|---|---|
| 7,423,989 B2* | 9/2008 | Hansen et al. ................ | 370/328 |
| 7,920,599 B1* | 4/2011 | Subramanian et al. ....... | 370/509 |
| 8,416,749 B2* | 4/2013 | Bui ............................ | 370/336 |
| 2005/0276337 A1* | 12/2005 | Khan ........................... | 375/260 |
| 2008/0317150 A1* | 12/2008 | Alexander et al. ............ | 375/260 |
| 2009/0122731 A1* | 5/2009 | Montojo et al. .............. | 370/280 |
| 2009/0163143 A1 | 6/2009 | De Rore | |
| 2009/0285241 A1 | 11/2009 | Zhang et al. | |
| 2010/0046645 A1 | 2/2010 | Nerella et al. | |
| 2012/0201316 A1* | 8/2012 | Zhang et al. .................. | 375/260 |
| 2013/0003790 A1* | 1/2013 | Blasco Claret et al. ....... | 375/219 |
| 2013/0114509 A1* | 5/2013 | Cai .............................. | 370/328 |

FOREIGN PATENT DOCUMENTS

KR  10-2009-0061564 A  6/2009

\* cited by examiner

*Primary Examiner* — Kevin Kim
(74) *Attorney, Agent, or Firm* — John R. Pessetto; Frederick J. Telecky, Jr.

(57) ABSTRACT

In at least some embodiments, a receiver includes channel estimation logic configured to a process a long training field symbol having a doubled cyclic prefix. The channel estimation logic is configured to vary an amount of the doubled cyclic prefix used for channel estimation. Further, in some embodiments, a wireless communication device includes logic to enable communications based on at least two long training field symbols having a doubled cyclic prefix as part of a synchronization header. Further, in some embodiments, a method includes receiving a long training field symbol having a synchronization header with a doubled cyclic prefix and varying an amount of the doubled cyclic prefix used for channel estimation.

10 Claims, 12 Drawing Sheets

FIG. 1

|  |  | ORIGINAL COMPLEX SEQUENCE | IMPROVED COMPLEX SEQUENCE | QPSK REAL SEQUENCE |
|---|---|---|---|---|
| LTF | OPTION 1 | 5.6003 | 3.848 | 5.2695 |
| LTF | OPTION 2 | 3.1794 | 3.1636 | 4.4236 |
| LTF | OPTION 3 | 3.8258 | 2.3298 | 4.1538 |
| LTF | OPTION 4 | 5.8345 | 1.8958 | 4.1017 |
| LTF | OPTION 5 | 4.2597 | 2.2462 | 4.3983 |
| STF | OPTION 1 | 2.2496 | 2.0708 | 3.7261 |
| STF | OPTION 2 | 2.2496 | 2.0615 | 4.2346 |
| STF | OPTION 3 | 3.4006 | 2.2462 | 4.3983 |
| STF | OPTION 4 | 3.4006 | 2.2462 | 4.3983 |
| STF | OPTION 5 | 3.0103 | 3.0103 | 3.0103 |

FIG. 2

| NUMBER OF OFDM SYMBOLS ||||
|---|---|---|---|
| 4 | 2 | M | N |
| STF | LTF | PHR | PSDU |
| SHR || PHR | PHY PAYLOAD |

FIG. 3A

| TONE NUMBER | VALUE | TONE NUMBER | VALUE | TONE NUMBER | VALUE | TONE NUMBER | VALUE |
|---|---|---|---|---|---|---|---|
| -64 | 0 | -32 | -2.9439 | 0 | 0 | 32 | 2.9439 |
| -63 | 0 | -31 | 0 | 1 | 0 | 33 | 0 |
| -62 | 0 | -30 | 0 | 2 | 0 | 34 | 0 |
| -61 | 0 | -29 | 0 | 3 | 0 | 35 | 0 |
| -60 | 0 | -28 | 0 | 4 | 0 | 36 | 0 |
| -59 | 0 | -27 | 0 | 5 | 0 | 37 | 0 |
| -58 | 0 | -26 | 0 | 6 | 0 | 38 | 0 |
| -57 | 0 | -25 | 0 | 7 | 0 | 39 | 0 |
| -56 | 0 | -24 | 2.9439 | 8 | 2.9439 | 40 | -2.9439 |
| -55 | 0 | -23 | 0 | 9 | 0 | 41 | 0 |
| -54 | 0 | -22 | 0 | 10 | 0 | 42 | 0 |
| -53 | 0 | -21 | 0 | 11 | 0 | 43 | 0 |
| -52 | 0 | -20 | 0 | 12 | 0 | 44 | 0 |
| -51 | 0 | -19 | 0 | 13 | 0 | 45 | 0 |
| -50 | 0 | -18 | 0 | 14 | 0 | 46 | 0 |
| -49 | 0 | -17 | 0 | 15 | 0 | 47 | 0 |
| -48 | -2.9439 | -16 | 2.9439 | 16 | -2.9439 | 48 | 2.9439 |
| -47 | 0 | -15 | 0 | 17 | 0 | 49 | 0 |
| -46 | 0 | -14 | 0 | 18 | 0 | 50 | 0 |
| -45 | 0 | -13 | 0 | 19 | 0 | 51 | 0 |
| -44 | 0 | -12 | 0 | 20 | 0 | 52 | 0 |
| -43 | 0 | -11 | 0 | 21 | 0 | 53 | 0 |
| -42 | 0 | -10 | 0 | 22 | 0 | 54 | 0 |
| -41 | 0 | -9 | 0 | 23 | 0 | 55 | 0 |
| -40 | -2.9439 | -8 | 2.9439 | 24 | 2.9439 | 56 | 0 |
| -39 | 0 | -7 | 0 | 25 | 0 | 57 | 0 |
| -38 | 0 | -6 | 0 | 26 | 0 | 58 | 0 |
| -37 | 0 | -5 | 0 | 27 | 0 | 59 | 0 |
| -36 | 0 | -4 | 0 | 28 | 0 | 60 | 0 |
| -35 | 0 | -3 | 0 | 29 | 0 | 61 | 0 |
| -34 | 0 | -2 | 0 | 30 | 0 | 62 | 0 |
| -33 | 0 | -1 | 0 | 31 | 0 | 63 | 0 |

FIG. 3B

| TONE NUMBER | VALUE | TONE NUMBER | VALUE | TONE NUMBER | VALUE | TONE NUMBER | VALUE |
|---|---|---|---|---|---|---|---|
| -32 | 0 | -16 | -2.0817 | 0 | 0 | 16 | 2.0817 |
| -31 | 0 | -15 | 0 | 1 | 0 | 17 | 0 |
| -30 | 0 | -14 | 0 | 2 | 0 | 18 | 0 |
| -29 | 0 | -13 | 0 | 3 | 0 | 19 | 0 |
| -28 | 0 | -12 | 2.0817 | 4 | 2.0817 | 20 | -2.0817 |
| -27 | 0 | -11 | 0 | 5 | 0 | 21 | 0 |
| -26 | 0 | -10 | 0 | 6 | 0 | 22 | 0 |
| -25 | 0 | -9 | 0 | 7 | 0 | 23 | 0 |
| -24 | -2.0817 | -8 | 2.0817 | 8 | -2.0817 | 24 | 2.0817 |
| -23 | 0 | -7 | 0 | 9 | 0 | 25 | 0 |
| -22 | 0 | -6 | 0 | 10 | 0 | 26 | 0 |
| -21 | 0 | -5 | 0 | 11 | 0 | 27 | 0 |
| -20 | -2.0817 | -4 | 2.0817 | 12 | 2.0817 | 28 | 0 |
| -19 | 0 | -3 | 0 | 13 | 0 | 29 | 0 |
| -18 | 0 | -2 | 0 | 14 | 0 | 30 | 0 |
| -17 | 0 | -1 | 0 | 15 | 0 | 31 | 0 |

FIG. 3C

| TONE NUMBER | VALUE | TONE NUMBER | VALUE | TONE NUMBER | VALUE | TONE NUMBER | VALUE |
|---|---|---|---|---|---|---|---|
| -16 | 0 | -8 | 2.0817 | 0 | 0 | 8 | 2.0817 |
| -15 | 0 | -7 | 0 | 1 | 0 | 9 | 0 |
| -14 | 0 | -6 | 0 | 2 | 0 | 10 | 0 |
| -13 | 0 | -5 | 0 | 3 | 0 | 11 | 0 |
| -12 | 2.0817 | -4 | 2.0817 | 4 | -2.0817 | 12 | -2.0817 |
| -11 | 0 | -3 | 0 | 5 | 0 | 13 | 0 |
| -10 | 0 | -2 | 0 | 6 | 0 | 14 | 0 |
| -9 | 0 | -1 | 0 | 7 | 0 | 15 | 0 |

FIG. 3D

| TONE NUMBER | VALUE | TONE NUMBER | VALUE | TONE NUMBER | VALUE | TONE NUMBER | VALUE |
|---|---|---|---|---|---|---|---|
| -8 | 0 | -4 | 1.5275 | 0 | 0 | 4 | 1.5275 |
| -7 | 0 | -3 | 0 | 1 | 0 | 5 | 0 |
| -6 | 1.5275 | -2 | 1.5275 | 2 | -1.5275 | 6 | -1.5275 |
| -5 | 0 | -1 | 0 | 3 | 0 | 7 | 0 |

FIG. 3E

| TONE NUMBER | VALUE | TONE NUMBER | VALUE | TONE NUMBER | VALUE | TONE NUMBER | VALUE |
|---|---|---|---|---|---|---|---|
| -4 | 0 | -2 | 1.7321 | 0 | 0 | 2 | -1.7321 |
| -3 | 0 | -1 | 0 | 1 | 0 | 3 | 0 |

FIG. 3F

| TONE NUMBER | VALUE | TONE NUMBER | VALUE | TONE NUMBER | VALUE | TONE NUMBER | VALUE |
|---|---|---|---|---|---|---|---|
| -64 | 0 | -32 | -1 | 0 | 0 | 32 | -1 |
| -63 | 0 | -31 | -1 | 1 | 1 | 33 | -1 |
| -62 | 0 | -30 | -1 | 2 | -1 | 34 | -1 |
| -61 | 0 | -29 | 1 | 3 | 1 | 35 | 1 |
| -60 | 0 | -28 | 1 | 4 | -1 | 36 | 1 |
| -59 | 0 | -27 | -1 | 5 | 1 | 37 | 1 |
| -58 | 0 | -26 | -1 | 6 | 1 | 38 | 1 |
| -57 | 0 | -25 | -1 | 7 | -1 | 39 | 1 |
| -56 | 0 | -24 | -1 | 8 | -1 | 40 | 1 |
| -55 | 0 | -23 | -1 | 9 | 1 | 41 | -1 |
| -54 | 0 | -22 | 1 | 10 | -1 | 42 | -1 |
| -53 | 0 | -21 | 1 | 11 | 1 | 43 | -1 |
| -52 | -1 | -20 | -1 | 12 | 1 | 44 | -1 |
| -51 | 1 | -19 | 1 | 13 | 1 | 45 | -1 |
| -50 | 1 | -18 | -1 | 14 | 1 | 46 | -1 |
| -49 | -1 | -17 | -1 | 15 | -1 | 47 | 1 |
| -48 | -1 | -16 | 1 | 16 | 1 | 48 | -1 |
| -47 | -1 | -15 | -1 | 17 | 1 | 49 | 1 |
| -46 | -1 | -14 | 1 | 18 | 1 | 50 | 1 |
| -45 | 1 | -13 | 1 | 19 | 1 | 51 | -1 |
| -44 | 1 | -12 | 1 | 20 | 1 | 52 | 1 |
| -43 | -1 | -11 | 1 | 21 | -1 | 53 | 0 |
| -42 | -1 | -10 | -1 | 22 | 1 | 54 | 0 |
| -41 | 1 | -9 | -1 | 23 | -1 | 55 | 0 |
| -40 | 1 | -8 | 1 | 24 | 1 | 56 | 0 |
| -39 | 1 | -7 | 1 | 25 | -1 | 57 | 0 |
| -38 | -1 | -6 | -1 | 26 | 1 | 58 | 0 |
| -37 | -1 | -5 | 1 | 27 | -1 | 59 | 0 |
| -36 | 1 | -4 | 1 | 28 | 1 | 60 | 0 |
| -35 | 1 | -3 | -1 | 29 | 1 | 61 | 0 |
| -34 | -1 | -2 | 1 | 30 | -1 | 62 | 0 |
| -33 | -1 | -1 | 1 | 31 | 1 | 63 | 0 |

FIG. 3G

| TONE NUMBER | VALUE | TONE NUMBER | VALUE | TONE NUMBER | VALUE | TONE NUMBER | VALUE |
|---|---|---|---|---|---|---|---|
| -32 | 0 | -16 | 1 | 0 | 0 | 16 | 1 |
| -31 | 0 | -15 | -1 | 1 | 1 | 17 | -1 |
| -30 | 0 | -14 | 1 | 2 | -1 | 18 | -1 |
| -29 | 0 | -13 | 1 | 3 | 1 | 19 | -1 |
| -28 | 0 | -12 | -1 | 4 | 1 | 20 | -1 |
| -27 | 0 | -11 | -1 | 5 | -1 | 21 | -1 |
| -26 | -1 | -10 | -1 | 6 | 1 | 22 | 1 |
| -25 | -1 | -9 | 1 | 7 | -1 | 23 | -1 |
| -24 | -1 | -8 | 1 | 8 | -1 | 24 | -1 |
| -23 | -1 | -7 | -1 | 9 | 1 | 25 | -1 |
| -22 | 1 | -6 | 1 | 10 | -1 | 26 | 1 |
| -21 | 1 | -5 | 1 | 11 | 1 | 27 | 0 |
| -20 | 1 | -4 | 1 | 12 | 1 | 28 | 0 |
| -19 | -1 | -3 | -1 | 13 | -1 | 29 | 0 |
| -18 | 1 | -2 | -1 | 14 | -1 | 30 | 0 |
| -17 | -1 | -1 | -1 | 15 | 1 | 31 | 0 |

FIG. 3H

| TONE NUMBER | VALUE | TONE NUMBER | VALUE | TONE NUMBER | VALUE | TONE NUMBER | VALUE |
|---|---|---|---|---|---|---|---|
| -16 | 0 | -8 | 1 | 0 | 0 | 8 | -1 |
| -15 | 0 | -7 | 1 | 1 | -1 | 9 | 1 |
| -14 | 0 | -6 | 1 | 2 | -1 | 10 | 1 |
| -13 | 1 | -5 | 1 | 3 | 1 | 11 | -1 |
| -12 | -1 | -4 | 1 | 4 | -1 | 12 | -1 |
| -11 | 1 | -3 | 1 | 5 | 1 | 13 | 1 |
| -10 | -1 | -2 | 1 | 6 | 1 | 14 | 0 |
| -9 | 1 | -1 | -1 | 7 | -1 | 15 | 0 |

FIG. 3I

| TONE NUMBER | VALUE | TONE NUMBER | VALUE | TONE NUMBER | VALUE | TONE NUMBER | VALUE |
|---|---|---|---|---|---|---|---|
| -8 | 0 | -4 | 1 | 0 | 0 | 4 | 1 |
| -7 | 1 | -3 | -1 | 1 | -1 | 5 | -1 |
| -6 | -1 | -2 | 1 | 2 | 1 | 6 | -1 |
| -5 | 1 | -1 | 1 | 3 | 1 | 7 | -1 |

FIG. 3J

| TONE NUMBER | VALUE | TONE NUMBER | VALUE | TONE NUMBER | VALUE | TONE NUMBER | VALUE |
|---|---|---|---|---|---|---|---|
| -4 | 0 | -2 | 1 | 0 | 0 | 2 | 1 |
| -3 | 1 | -1 | 1 | 1 | -1 | 3 | -1 |

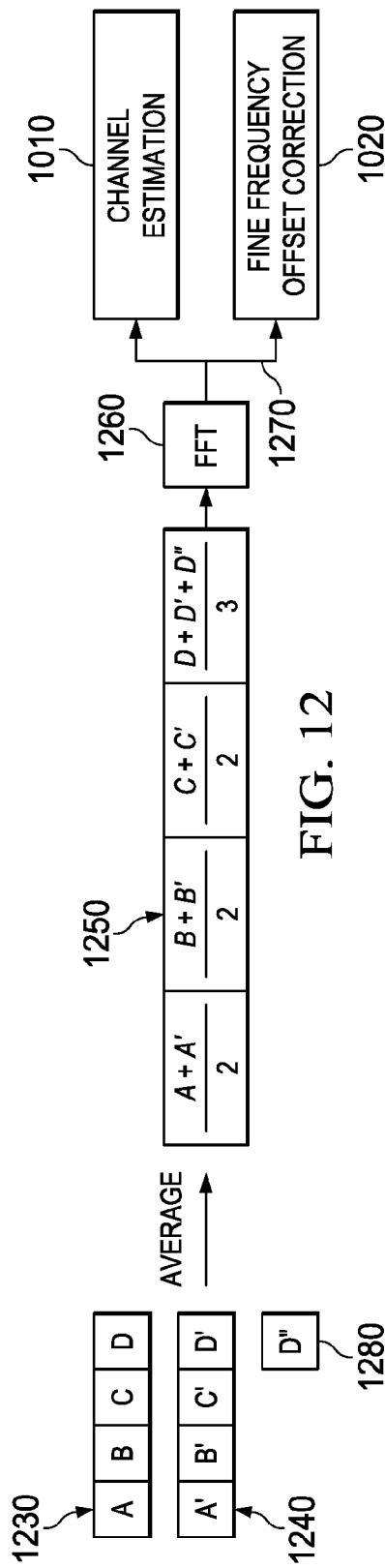

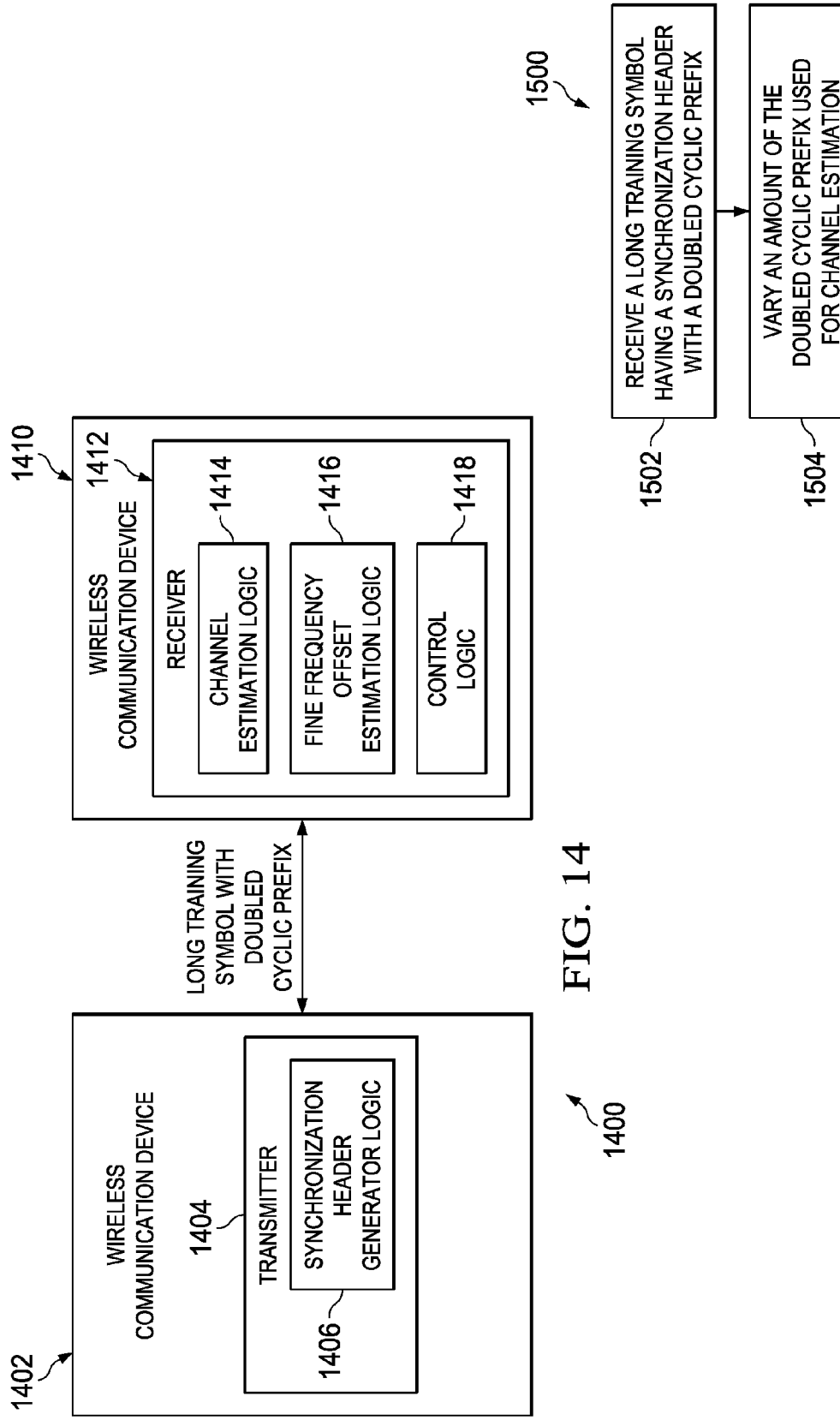

CHANNEL ESTIMATION BASED ON LONG TRAINING SYMBOL WITH DOUBLED CYCLIC PREFIX

CROSS-REFERENCE TO RELATED APPLICATION

The present application claims priority to U.S. Provisional Patent Application No. 61/426,668, filed on Dec. 23, 2010; which is hereby incorporated herein by reference. The present application is related to U.S. patent application Ser. No. 12/868,397 filed on Aug. 25, 2010; which claims priority to U.S. Provisional Patent Application No. 61/238,445, filed on Aug. 31, 2009; and U.S. Provisional Patent Application No. 61/287,586, filed on Dec. 17, 2009; which are hereby incorporated herein by reference.

BACKGROUND

Wireless personal area networks ("WPANs") are used to convey information over relatively short distances. Unlike wireless local area networks ("WLANs"), WPANs need little or no infrastructure, and WPANS allow small, power-efficient, and inexpensive solutions to be implemented for a wide range of devices. Smart Utility Networks ("SUNs") may operate either over short ranges such as in a mesh network where utility meter information is sent from one utility meter to another or over longer ranges such as in a star topology where utility meter information is sent to a poletop collection point. The terms WPAN and SUN are used interchangeably in this document.

For a packet-based OFDM system, a preamble is provided at the start of the packet. In some systems, the preamble is referred as synchronization header. Usually, the preamble (synchronization header) consists of two parts referred to short training field (STF) and long training field (LTF). STF allows automatic gain control AGC, packet detection, fractional frequency offset estimation, and coarse synchronization and LTF allows integer frequency offset estimation, fine synchronization, fine frequency offset estimation, and channel estimation.

The quality of LTF impacts the system performance because it determines the quality of the channel estimation and the fine frequency offset estimation. The quality measure of the signal is SNR. Thus, it is important to process LTF without hurting its inherent SNR. In the LTF, a doubled cyclic prefix CP is provided to give robustness to inaccuracy in fast Fourier transform FFT timing placement.

SUMMARY

The problems noted above are solved in large part by a receiver comprising channel estimation logic configured to a process a long training field symbol having a doubled cyclic prefix. The channel estimation logic is configured to vary an amount of the doubled cyclic prefix used for channel estimation.

Further, in at least some embodiments, a wireless communication device comprises logic to enable communications based on at least two long training field symbols having a doubled cyclic prefix as part of a synchronization header.

Further, in at least some embodiments, a method comprising receiving a long training field symbol having a synchronization header with a doubled cyclic prefix. The method also comprises varying an amount of the doubled cyclic prefix used for channel estimation.

BRIEF DESCRIPTION OF THE DRAWINGS

For a more complete understanding of the present disclosure, reference is now made to the accompanying drawings and detailed description, wherein like reference numerals represent like parts:

FIG. 1 compares peak-to-average power ratios (PAR) in decibels between various sequences of short training fields ("STFs") and long training fields ("LTFs") in accordance with various embodiments;

FIG. 2 illustrates an embodiment of a packet containing a STF and LTF in accordance with various embodiments;

FIGS. 3A-3J illustrate the frequency domain representations of embodiments of STFs and LTFs generated with different inverse fast Fourier transform settings in accordance with various embodiments;

FIG. 12 illustrates frequency LTF processing of fine frequency offset correction at a receiver in accordance with an embodiment of the invention;

FIG. 13 illustrates time domain LTF processing of fine frequency offset correction at a receiver in accordance with an embodiment of the invention;

FIG. 14 illustrates a wireless communication system in accordance with embodiments of the invention; and FIG. 15 illustrates a method in accordance with embodiments of the invention.

NOTATION AND NOMENCLATURE

Figure 4:
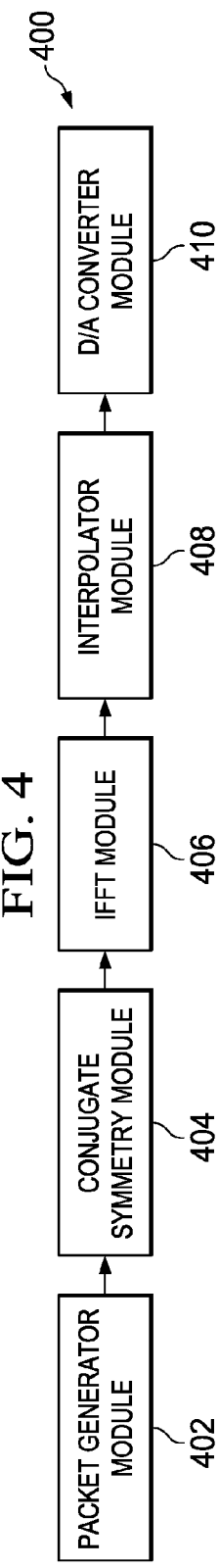
FIG. 4 illustrates generation of STFs and LTFs via modules in accordance with various embodiments.

Certain terms are used throughout the following claims and description to refer to particular components. As one skilled in the art will appreciate, different entities may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean an optical, wireless, indirect electrical, or direct electrical connection. Thus, if a first device couples to a second device, that connection may be through an indirect electrical connection via other devices and connections, through a direct optical connection, etc. Additionally, the term "system" refers to a collection of two or more hardware components, and may be used to refer to an electronic device.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein are methods and systems for improving the signal-to-noise (SNR) of the long training field (LTF) for channel estimation and/or fine frequency offset estimation. The technique disclosed herein involves a transmitting device generating at least two LTFs having a doubled cyclic prefix as part of a synchronization header. A receiving device is configured to perform channel estimation and/or fine frequency offset estimation by processing the LTFs having the doubled cyclic prefix, where the receiving device is able to vary the amount of the doubled cyclic prefix used for channel estimation and/or fine frequency offset estimation. The fine frequency offset estimation may be performed by the receiving device in the time domain or the frequency domain. In some embodiments, the amount of the doubled prefix that will be used for channel estimation and/or fine frequency offset estimation is based on a channel impulse response length estimated by the receiving device. If the estimated channel impulse response length is less than a predetermined threshold, the receiving device selects use a first amount of the doubled cycle prefix. For example, the first amount may correspond to at least a D" block of the doubled cyclic prefix. If the estimated channel impulse response length is more than the predetermined threshold, the receiving device avoids usage of the doubled cycle prefix for channel estimation or fine frequency offset estimation.

A WPAN or low-rate WPAN is a simple, low-cost communication network that allows wireless connectivity in applications with limited power and relaxed throughput requirements. The main objectives of a WPAN are ease of installation, reliable data transfer, short-range operation, extremely low cost, reasonable battery life, and a simple and flexible protocol.

Some characteristics of a WPAN are:
Over-the-air data rates of 250 kb/s, 100 kb/s, 40 kb/s, and 20 kb/s
Star or peer-to-peer operation
Allocated 16-bit short or 64-bit extended addresses
Optional allocation of guaranteed time slots
Carrier sense multiple access with collision avoidance channel access
Low power consumption
Energy detection
Link quality indication
16 channels in the 2450 MHz band, 30 channels in the 915 MHz band, and 3 channels in the 868 MHz band.

These characteristics are not requirements, and each WPAN may deviate from the characteristics in numerous ways. Two different device types can participate in a WPAN: a full-function device ("FFD") and a reduced-function device ("RFD"). The FFD can operate in three modes serving as a personal area network ("PAN") coordinator or a device. A FFD can talk to RFDs or other FFDs while a RFD can talk only to a FFD. More information can be found at IEEE Std. 802.15.4-2006 available at http://www.ieee802.org/15/pub/TG4.html and hereby incorporated by reference.

A utility network or smart utility network ("SUN") is a low-rate (e.g., 40 kbps to 1 Mbps) low-power WPAN that is specifically designed for use in utility metering applications such as transmitting electric, gas, water usage, and other like data from the customer premises to a data collection point operated by the utility. For example, utility meters are installed for each house in a residential neighborhood, and the usage data is sent periodically from each utility meter to a data collection point, which is an element of the WPAN. The data collection point is connected by fiber, copper wire, or wireless connection to a central office that collects all the usage data for a region. Usage data is sent either directly from each utility meter to the collection point or from utility meter to utility meter until the collection point is reached in a star or network formation, respectively.

This disclosure describes preamble sequences for use in WPAN packets that include a short training field ("STF") and/or a long training field ("LTF") for the orthogonal frequency division multiplexing ("OFDM") physical layer ("PHY"). A STF and LTF are a number of bits in a packet, appearing consecutively in a preamble of the packet in at least one embodiment. In at least one embodiment, the STF has about one quarter the number of non-zero tones as compared to the LTF in order to generate a 4× repetition within the IFFT length. The STF is used by the receiver for automatic gain control settling, packet/boundary detection and/or coarse frequency offset estimation as discussed herein. The LTF is used for fine frequency offset estimation, FFT placement, integer frequency offset estimation, and/or channel estimation as discussed herein. Applicability is not limited to SUNs; rather, the teachings herein may apply to any wireless communication system. In other embodiments, the amount and repetition of the STFs and LTFs vary, and the repetitions may or may not include the cyclic prefix. In the WPAN packets, there are two or more STF OFDM symbols followed by multiple LTF OFDM symbols, the packet header, and the packet payload in at least one embodiment. In other embodiments, the type, order, and number of packet elements vary.

Table 1 illustrates the MCS levels for the 5 options for OFDM block size. Option 1 is generated with a 128 point IFFT, Option 2 is generated with a 64 point IFFT, and Options 3, 4, and 5 use 32, 16, and 8 point IFFTs, respectively.

TABLE 1

Modulation and Coding Schemes for 5 IFFT Sizes
Number of Data Sub-Carriers (NDSC)

| Option | 1 100 | | 2 48 | | 3 22 | | 4 12 | | 5 4 | |
|---|---|---|---|---|---|---|---|---|---|---|
| MCS | NCBPS | NDBPS | NCBPS | NDBPS | NCBPS | NDBPS | NCBPS | NDBPS | NCBPS | NDBPS |
| 0 | 100 | 12.5 | | | | | | | | |
| 1 | 100 | 25 | 48 | 12 | 22 | 5.5 | | | | |
| 2 | 100 | 50 | 48 | 24 | 22 | 11 | 12 | 6 | | |
| 3 | 100 | 75 | 48 | 36 | 22 | 16.5 | 12 | 9 | | |
| 4 | 200 | 100 | 96 | 48 | 44 | 22 | 24 | 12 | | |

TABLE 1-continued

Modulation and Coding Schemes for 5 IFFT Sizes
Number of Data Sub-Carriers (NDSC)

| Option | 1<br>100 | | 2<br>48 | | 3<br>22 | | 4<br>12 | | 5<br>4 | |
|---|---|---|---|---|---|---|---|---|---|---|
| MCS | NCBPS | NDBPS | NCBPS | NDBPS | NCBPS | NDBPS | NCBPS | NDBPS | NCBPS | NDBPS |
| 5 | 200 | 125 | 96 | 60 | 44 | 27.5 | 24 | 15 | | |
| 6 | | | 96 | 72 | 44 | 33 | 24 | 18 | 8 | 6 |
| 7 | | | 192 | 96 | 88 | 44 | 48 | 24 | 16 | 8 |
| 8 | | | 192 | 120 | 88 | 55 | 48 | 30 | 16 | 10 |
| 9 | | | | | 88 | 66 | 48 | 36 | 16 | 12 |

NCBPS = number of coded bits per symbol,
NDBPS = number of data bits per symbol

Table 2 illustrates alternative MCS levels where the number of data sub-carriers are integer multiples of the number of data sub-carriers for smaller size IFFTs.

TABLE 2

Alternative Modulation and Coding Schemes for 5 IFFT Sizes

Number of Data Sub-Carrier (NDSC)

| Option | 1<br>96 | | | 2<br>48 | | | 3<br>24 | | | 4<br>12 | | | 5<br>4 | | |
|---|---|---|---|---|---|---|---|---|---|---|---|---|---|---|---|
| MCS | NCBPS | NDBPS | Rate | NCBPS | NDBPS | Rate | NCBPS | NDBPS | Rate | NCBPS | NDBPS | Rate | NCBPS | NDBPS | Rate |
| 0 | 24 | 12 | 93.75 | | | | | | | | | | | | |
| 1 | 48 | 24 | 187.5 | 24 | 12 | 93.75 | 12 | 6 | 46.88 | | | | | | |
| 2 | 96 | 48 | 375 | 48 | 24 | 187.5 | 24 | 12 | 93.75 | 12 | 6 | 46.88 | | | |
| 3 | 96 | 72 | 562.5 | 48 | 36 | 281.25 | 24 | 18 | 140.63 | 12 | 9 | 70.31 | | | |
| 4 | 192 | 96 | 750 | 96 | 48 | 375 | 48 | 24 | 187.5 | 24 | 12 | 93.75 | | | |
| 5 | 192 | 120 | 937.5 | 96 | 60 | 468.75 | 48 | 30 | 234.38 | 24 | 15 | 117.19 | | | |
| 6 | | | | 96 | 72 | 562.5 | 48 | 36 | 281.25 | 24 | 18 | 140.63 | 8 | 6 | 46.88 |
| 7 | | | | 192 | 96 | 750 | 96 | 48 | 375 | 48 | 24 | 187.5 | 16 | 8 | 62.5 |
| 8 | | | | 192 | 120 | 937.5 | 96 | 60 | 468.75 | 48 | 30 | 234.38 | 16 | 10 | 78.13 |
| 9 | | | | | | | 96 | 72 | 562.5 | 48 | 36 | 281.25 | 16 | 12 | 93.75 |

The STFs and LTFs sequences discussed below have low peak-to-average power ratios ("PARs"). In addition to providing packets generated using these STFs and LTFs with low PARs: 1) ensure that the transmitter will not be clipped, therefore ensuring a good error vector magnitude ("EVM") for the preamble and the channel estimation sequence; 2) allow for boosts to the power of the preamble without clipping; and 3) allow for better preamble range for increased robustness in the system.

OFDM is a modulation technique that can be used for the physical layer of the SUN. Some examples of complex OFDM LTF sequences are shown below. Option 1 is generated using a 128 point inverse fast Fourier transform ("IFFT") at the Nyquist rate, Option 2 is generated using a 64 point IFFT, and Options 3, 4, and 5 are generated using 32, 16, and 8 point IFFTs, respectively.

LTF_freq (Option-1) = [0, 1, −1, 1, −1, 1, 1, −1, −1, 1, −1, 1, 1, 1, 1, −1, 1, 1, 1, 1, 1, −1, 1, −1, 1, −1, 1, 1, −1, 1, −1, −1, −1, 1, 1, 1, 1, 1, 1, −1, −1, −1, −1, −1, −1, 1, −1, 1, 1, −1, 1, zeros(1, 23),

−1, 1, 1, −1, −1, −1, 1, 1, −1, −1, 1, 1, 1, −1, −1, 1, 1,

−1, −1, −1, −1, −1, 1, 1, −1, −1, −1, −1, 1, 1, 1, −1, 1, 1,

−1, −1, 1, −1, 1, 1, 1, 1, −1, −1, 1, 1, −1, 1, 1, −1, 1, 1].

LTF_freq(Option-2) = [0, 1, −1, 1, 1, −1, 1, −1, −1, 1, −1, 1,

1, −1, −1, 1, 1, −1, −1, −1, −1, −1, 1, −1, −1, −1, 1, zeros(1, 11), −1, −1, −1, −1, 1, 1, 1, −1, 1, −1, 1,

−1, 1, 1, −1, −1, −1, 1, 1, −1, 1, 1, 1, −1, −1, −1].

LTF_freq(Option-3) = [0, −1, −1, 1, −1, 1, 1, −1, −1, 1, 1, −1, −1, 1, zeros(1, 5), 1, −1, 1, −1, 1, 1, 1, 1, 1, 1, 1, 1, −1].

LTF_freq(Option-4) = [0, −1, 1, 1, 1, −1, −1, −1, 0, 1, −1, 1, 1, −1, 1, 1].

LTF_freq(Option-5) = [0, −1, 1, −1, 0, 1, 1, 1].

These sequences are given in Matlab format. For Option 5, the first 0 represents the DC tone, which is not used. The next three subcarriers are 1, 2, and 3 with data −1, 1, −1, respectively. The negative subcarriers −4, −3, −2, −1 have data 0, 1, 1, 1, respectively. In general, if there are N subcarriers, the Matlab subcarrier numbering is 0, 1, 2, 3, . . . , (N/2)−1 followed by −(N/2), . . . , −3, −2, −1.

Some examples of complex STF sequences are shown below.

$$STF\_freq(Option\text{-}1) =$$
$$sqrt(104/24) * [0, 0, 0, 0, -1, 0, 0, 0, -1, 0, 0, 0, 1, 0, 0, 0, 1, 0, 0,$$
$$0, 1, 0, 0, 0, -1, 0, 0, 0, -1, 0, 0, 0, 1, 0, 0, 0, -1, 0, 0, 0,$$
$$1, 0, 0, 0, -1, 0, 0, 0, 1, 0, 0, 0, -1, 0, 0, 0, 0, 0, 0, 0, 0,$$
$$0, 0, 0, 0, 0, 0, 0, 0, 0, 0, 0, 0, 0, -1, 0, 0, 0, -1, 0, 0, 0,$$
$$-1, 0, 0, 0, -1, 0, 0, 0, -1, 0, 0, 0, -1, 0, 0, 0, -1, 0, 0, 0,$$
$$1, 0, 0, 0, 1, 0, 0, 0, -1, 0, 0, 1, 0, 0, 1, 0, 0, 0, -1, 0, 0, 0].$$
$$STF\_freq(Option\text{-}2) = sqrt(52/12) * [0, 0, 0, 0, 1, 0, 0, 0, -1,$$
$$0, 0, 0, 1, 0, 0, 0, 1, 0, 0, 0, -1, 0, 0, 0, 1, 0, 0, 0,$$
$$0, 0, 0, 0, 0, 0, 0, 0, 0, 0, 0, -1, 0, 0, 0, -1, 0,$$
$$0, 0, -1, 0, 0, 0, 1, 0, 0, 0, 1, 0, 0, 0, 1, 0, 0, 0].$$
$$STF\_freq(Option\text{-}3) = sqrt(26/6) * [0, 0, 0, 0, -1, 0, 0, 0, 1, 0, 0, 0,$$
$$-1, 0, 0, 0, 0, 0, 0, 1, 0, 0, 0, 1, 0, 0, 0, 1, 0, 0, 0].$$
$$STF\_freq(Option\text{-}4) = sqrt(14/6) * [0, 0, -1, 0, 1,$$
$$0, -1, 0, 0, 0, 1, 0, 1, 0, 1, 0].$$
$$STF\_freq(Option\text{-}5) = sqrt(6/2) * [0, 0, -1, 0, 0, 0, 1, 0].$$

Using these sequences, PAR can be reduced significantly as shown in the example of FIG. 1. Specifically, the first column identifies the LTF and STF sequences. The second column identifies the IFFT options used. The third column lists the PAR for communication without STFs or LTFs optimized for PAR. The fourth column lists the PAR for communication using optimized STFs and LTFs. The fifth column lists the PAR for communication using quadrature phase shift keying ("QPSK") modulation.

Some examples of alternative LTF sequences are shown below. These sequences are given in Matlab format. For Option 5, the first 0 represents the DC tone, which is not used. The next three subcarriers are 1, 2, and 3. In general, if there are N subcarriers, the Matlab subcarrier numbering is 0, 1, 2, 3, ..., (N/2)−1 followed by −(N/2), ..., −3, −2, −1.

LTF alternatives for option 4:
$ltfr4 = 0\ -1\ -1\ 1\ -1\ -1\ 1\ -1\ 0\ 1\ 1\ 1\ -1\ -1\ -1\ 1$
$ltfr4 = 0\ -1\ 1\ 1\ 1\ -1\ -1\ -1\ 0\ 1\ -1\ 1\ 1\ -1\ 1\ 1$
$ltfr4 = 0\ 1\ -1\ -1\ -1\ 1\ 1\ 1\ 0\ -1\ 1\ -11\ -1\ 1\ -1\ -1$
$ltfr4 = 0\ 1\ 1\ -1\ 1\ 1\ -1\ 1\ 0\ -1\ -1\ -1\ 1\ 1\ 1\ -1.$ LTF alternatives for option 5:
$ltfr5 = 0\ -1\ -1\ -1\ 0\ 1\ -1\ 1$
$ltfr5 = 0\ -1\ 1\ -1\ 0\ 1\ 1\ 1$
$ltfr5 = 0\ 1\ -1\ 1\ 0\ -1\ -1\ -1$
$ltfr5 = 0\ 1\ 1\ 1\ 0\ -1\ 1\ -1$
$ltfr5 = 0\ -1\ -1\ -1\ -1\ 1\ 1\ -1$
$ltfr5 = 0\ -1\ 1\ -1\ 1\ 1\ -1\ -1$
$ltfr5 = 0\ 1\ -1\ 1\ -1\ -1\ 1\ 1$
$ltfr5 = 0\ 1\ 1\ 1\ 1\ -1\ -1\ 1.$ Some examples of alternative STF sequences are shown below. These sequences are given in Matlab format. For Option 5, the first 0 represents the DC tone, which is not used. The next three subcarriers are 1, 2, and 3. In general, if there are N subcarriers, the Matlab subcarrier numbering is 0, 1, 2, 3, ..., (N/2)−1 followed by −(N/2), ..., −3, −2, −1.

STF Alternatives for Option 2:

$stfr2 = 0\ 0\ 0\ 0\ -1\ 0\ 0\ 0\ -1\ 0\ 0\ 0\ -1\ 0\ 0\ 0\ 1\ 0\ 0\ 0\ 1$
$\phantom{stfr2 = }0\ 0\ 0\ 1\ 0\ 0\ 0\ 0\ 0\ 0\ 0\ 0\ 0\ 0\ 0\ 0\ 0\ 0\ 0\ -1\ 0$
$\phantom{stfr2 = }0\ 0\ 1\ 0\ 0\ 0\ -1\ 0\ 0\ 0\ -1\ 0\ 0\ 0\ 1\ 0\ 0\ 0\ -1\ 0\ 0$
$\phantom{stfr2 = }0$ $stfr2 = 0\ 0\ 0\ 0\ -1\ 0\ 0\ 0\ 1\ 0\ 0\ 0\ -1\ 0\ 0\ 0\ -1\ 0\ 0\ 0\ 1$
$\phantom{stfr2 = }0\ 0\ 0\ -1\ 0\ 0\ 0\ 0\ 0\ 0\ 0\ 0\ 0\ 0\ 0\ 0\ 0\ 0\ 1\ 0$
$\phantom{stfr2 = }0\ 0\ 1\ 0\ 0\ 0\ 1\ 0\ 0\ 0\ -1\ 0\ 0\ 0\ -1\ 0\ 0\ 0\ -1\ 0\ 0$
$\phantom{stfr2 = }0$ $stfr2 = 0\ 0\ 0\ 0\ 1\ 0\ 0\ 0\ -1\ 0\ 0\ 0\ 1\ 0\ 0\ 0\ 1\ 0\ 0\ 0\ -1$
$\phantom{stfr2 = }0\ 0\ 0\ 1\ 0\ 0\ 0\ 0\ 0\ 0\ 0\ 0\ 0\ 0\ 0\ 0\ 0\ 0\ -1\ 0$
$\phantom{stfr2 = }0\ 0\ -1\ 0\ 0\ 0\ -1\ 0\ 0\ 0\ 1\ 0\ 0\ 0\ 1\ 0\ 0\ 0\ 1\ 0\ 0$
$\phantom{stfr2 = }0$ $stfr2 = 0\ 0\ 0\ 0\ 1\ 0\ 0\ 0\ 1\ 0\ 0\ 0\ 1\ 0\ 0\ 0\ -1\ 0\ 0\ 0\ -1$
$\phantom{stfr2 = }0\ 0\ 0\ -1\ 0\ 0\ 0\ 0\ 0\ 0\ 0\ 0\ 0\ 0\ 0\ 0\ 0\ 0\ 1\ 0$
$\phantom{stfr2 = }0\ 0\ -1\ 0\ 0\ 0\ 1\ 0\ 0\ 0\ 1\ 0\ 0\ 0\ -1\ 0\ 0\ 0\ 1\ 0\ 0$
$\phantom{stfr2 = }0.$ STF Alternatives for Option 3:

$stfr3 = 0\ 0\ 0\ 0\ -1\ 0\ 0\ 0\ -1\ 0\ 0\ 0\ -1\ 0\ 0\ 0\ 0\ 0\ 0\ 1$
$\phantom{stfr3 = }0\ 0\ 0\ -1\ 0\ 0\ 0\ 1\ 0\ 0\ 0$ $stfr3 = 0\ 0\ 0\ 0\ -1\ 0\ 0\ 0\ 1\ 0\ 0\ 0\ -1\ 0\ 0\ 0\ 0\ 0\ 0\ 1$
$\phantom{stfr3 = }0\ 0\ 0\ 1\ 0\ 0\ 0\ 1\ 0\ 0\ 0$ $stfr3 = 0\ 0\ 0\ 0\ 1\ 0\ 0\ 0\ -1\ 0\ 0\ 0\ 1\ 0\ 0\ 0\ 0\ 0\ 0\ -1$
$\phantom{stfr3 = }0\ 0\ 0\ -1\ 0\ 0\ 0\ -1\ 0\ 0\ 0$ $stfr3 = 0\ 0\ 0\ 0\ 1\ 0\ 0\ 0\ 1\ 0\ 0\ 0\ 1\ 0\ 0\ 0\ 0\ 0\ 0\ -1$
$\phantom{stfr3 = }0\ 0\ 0\ 1\ 0\ 0\ 0\ -1\ 0\ 0\ 0.$ STF alternatives for option 4:

$stfr4 = 0\ 0\ -1\ 0\ -1\ 0\ -1\ 0\ 0\ 0\ 1\ 0\ -1\ 0\ 1\ 0$ $stfr4 = 0\ 0\ -1\ 0\ 1\ 0\ -1\ 0\ 0\ 0\ 1\ 0\ 1\ 0\ 1\ 0$ $stfr4 = 0\ 0\ 1\ 0\ -1\ 0\ 1\ 0\ 0\ 0\ -1\ 0\ -1\ 0\ -1\ 0$ $stfr4 = 0\ 0\ 1\ 0\ 1\ 0\ 1\ 0\ 0\ 0\ -1\ 0\ 1\ 0\ -1\ 0.$ STF alternatives for option 5:

$stfr5 = 0\ 0\ -1\ 0\ 0\ 0\ -1\ 0$ $stfr5 = 0\ 0\ -1\ 0\ 0\ 0\ 1\ 0$ $stfr5 = 0\ 0\ 1\ 0\ 0\ 0\ -1\ 0$ $stfr5 = 0\ 0\ 1\ 0\ 0\ 0\ 1\ 0.$ FIG. 2 illustrates a packet format using STFs and LTFs in at least one embodiment. A synchronization header ("SHR") comprises a STF and LTF. As illustrated, the STF and LTF are four and two symbols long respectively, but each can be any size in various embodiments. The STF allows a device to perform automatic gain control ("AGC"), packet detection, de-assertion of clear channel assessment ("CCA") based on CCA modes (CCA Mode 1, 2, or 3), and coarse synchronization. The LTF allows a device to perform fine synchronization and perform channel estimation. The packet header ("PHR") can be any number of data symbols or bits "M." In at least one embodiment, the PHR contains:

A Rate field specifying the data rate of the payload frame (5 bits);
One reserved bit after the Rate field;
A Frame Length field specifying the length of the payload (11 bits);
Two reserved bits after the Frame Length field;
A Scrambler field specifying the scrambling seed (2 bits);
One reserved bit after the Scrambler field;
A Header Check Sequence ("HCS") 8-bit CRC taken over the data fields only; and
Six tail bits, which are all zeros, for Viterbi decoder flushing.

The PHR is encoded at the lowest data rate supported for each bandwidth option in at least one embodiment. The physical layer convergence protocol service data unit ("PSDU"), which can be any number of data symbols or bits "N," carries a media access control ("MAC") sublayer frame, which comprises a MAC header, MAC payload, and MAC cyclic redundancy check ("CRC") in at least one embodiment. The PSDU also carries convolutional encoder tail-bits, which can be six zeros, and pad-bits to extend the data to fill an integer number of OFDM symbols.

For OFDM, the STF and LTF fields comprise the preamble. Various embodiments for the STF and LTF for the five options are defined by FIGS. 3A-3J. These figures correspond to the Improved Complex Sequence column in FIG. 1. FIG. 3A shows the frequency domain representation of the STF for Option 1. The scaling factor used in the figure is sqrt(104/12). However, various scaling factors are used in various other embodiments, and the scaling factor can be changed to obtain a desired signal level FIG. 3B shows the frequency domain representation of the STF for Option 2. The scaling factor used in the figure is sqrt(52/12). FIG. 3C shows the frequency domain representation of the STF for Option 3. The scaling factor used in the figure is sqrt(26/6). FIG. 3D shows the frequency domain representation of the STF for Option 4. The scaling factor used in the figure is sqrt(14/6). FIG. 3E shows the frequency domain representation of the STF for Option 5. The scaling factor used in the figure is sqrt(6/2).

LTFs for the five scalable bandwidth OFDM options are defined in FIGS. 3F-3J. FIG. 3F shows the frequency domain representation of the LTF for Option 1. FIG. 3G shows the frequency domain representation of the LTF for Option 2. Similarly, FIGS. 3H-I show the frequency domain representations of the LTFs for Options 3-5.

FIG. 4 illustrates modules 400 or logic in a device for generating and transmitting the STFs and LTFs. The device sends and receives packets in a WPAN as part of a SUN in at least one embodiment. The device preferably comprises a processor, an antenna coupled to the processor, and memory coupled to the processor. At 402, packets are generated, and the packets contain data symbols that may be binary phase shift keyed ("BPSK") (−1−j and 1+j), rotated BPSK (−1 and 1), QPSK (−1−j, −1+j, 1−j, and 1+j), or rotated QPSK (−1, 1, −j, and j).

At 404, conjugate symmetry may be applied to the symbols in the frequency domain, thus producing a real signal in the time domain (i.e., no complex portion to the signal). At a transmitter, this real sequence only requires one digital to analog converter ("DAC") because there is no complex portion to be processed. DCM can also be used for the header to provide frequency diversity. In an alternative embodiment, a complex module or logic is turned off or run at reduced power, and the total power necessary to operate the device is reduced. In an alternative embodiment, the conjugate symmetry may be omitted so that a complex STF and LTF is produced.

At 406, the IFFT converts the symbols to a time domain sequence. In at least one embodiment, the STF and LTF can be generated offline using the IFFT to form time domain sequences, and these can be stored and used in the device. The Time-Domain STF for Option-n (n=1,2,3,4,5) is obtained as follows:

STF_time(Option-n)=IFFT(STF_freq(Option-n)).

The time-domain STF is repeated to fill four OFDM symbols with the last ¼ symbol repetition negated before transmission in at least one embodiment. In other embodiments, the size of the STF and the size of the negated portion vary such as having the last two repetitions of ¼ symbol being negated.

The Time-Domain LTF for Option-n (n=1,2,3,4,5) is obtained as follows:

LTF_time(Option-n)=IFFT(LTF_freq(Option-n)).

In at least one embodiment, the time-domain LTF is repeated to fill two OFDM symbols before transmission. In other embodiments, the size of the LTF varies.

Figure 5:
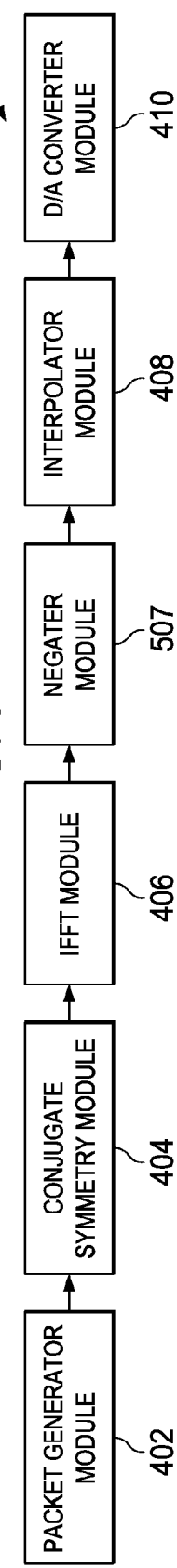
FIG. 5 illustrations generation of STFs via modules in accordance with various embodiments.

At 408, frequency domain interpolation is performed by inserting extra zeros after the positive sub-carriers. Alternatively, a time-domain interpolator can be used to generate an oversampled signal at a transmitter. The interpolation is part of the IFFT in at least one embodiment. At 410, a DAC converts signals from digital to analog in preparation for transmittal. In another embodiment, as shown in FIG. 5, the last repetition in the STF is negated at 507. Specifically, the STF comprises a group of bits that are repeated. In such an embodiment, the last group of bits is negated.

The receiving device implements a correlator to search for the preamble in at least one embodiment. The correlation is performed using the known transmitted preamble at the device. In another embodiment, the device performs a delayed correlation by storing the received signal in memory, and correlating a delayed version of the preamble with a non-delayed version. For example, if the preamble repeats every 128 samples, then the delay can be set to 128 samples. In addition, the phase rotation at the peak correlation provides an estimate of the carrier-frequency offset.

For each of the 5 options, both a short and long training field can be defined. For Option 5 with an IFFT size of 8, the STF can be defined in the frequency domain as:

[0 0 −1 0 0 0 −1 0].

The corresponding sub-carriers are given below.

DC 1 2 3 −4 −3 −2 −1.

Applying the IFFT results in:

[−0.2500 0 0.2500 0 −0.2500 0 0.2500 0].

At the transmitter, interpolation occurs to at least four times the sample rate in at least one embodiment. This interpolation can occur as part of the IFFT or after the IFFT. For example, 24 zeros are inserted after the highest positive frequency before taking the IFFT as shown below.

4*IFFT([0 0 −1 0 zeros(1,24) 0 0 −1 0]=[−0.2500 −0.2310 −0.1768 −0.0957 0 0.0957 0.1768 0.2310 0.2500 0.2310 0.1768 0.0957 0 −0.0957 −0.1768 −0.2310 −0.2500 −0.2310 −0.1768 −0.0957 0 0.0957 0.1768 0.2310 0.2500 0.2310 0.1768 0.0957 0 −0.0957 −0.1768 −0.2310].

These sequences are given in Matlab format. For Option 5, the first 0 represents the DC tone, which is not used. The next three subcarriers are 1, 2, and 3. In general, if there are N subcarriers, the Matlab subcarrier numbering is 0, 1, 2, 3, . . . , (N/2)−1 followed by −(N/2), . . . , −3, −2, −1. For Option 5 with an IFFT size of 8, the STF can be defined in the frequency domain as:

Option 5: $PAR = 3.0103$ dB

[0 0 −1 0 0 0 −1 0]

[0 0 1 0 0 0 1 0].

For Option 4, the STF can be Defined in the Frequency Domain as:

Option 4: $PAR = 4.3983$ dB

[0 0 −1 0 −1 0 1 0 0 0 1 0 −1 0 −1 0]

[0 0 −1 0 1 0 1 0 0 0 1 0 1 0 −1 0]

[0 0 1 0 −1 0 −1 0 0 0 −1 0 −1 0 1 0]

[0 0 1 0 1 0 −1 0 0 0 −1 0 1 0 1 0].

For Option 3, the STF can be Defined in the Frequency Domain as:

Option 3: $PAR = 4.3983$ dB

[0 0 0 0 −1 0 0 0 −1 0 0 0 1 0 0 0 0 0 0 0 1 0 0 0 −1 0 0 0 −1 0 0 0]

[0 0 0 0 −1 0 0 0 1 0 0 0 1 0 0 0 0 0 0 0 1 0 0 0 1 0 0 0 −1 0 0 0]

[0 0 0 0 1 0 0 0 −1 0 0 0 −1 0 0 0 0 0 0 0 −1 0 0 0 −1 0 0 0 1 0 0 0]

[0 0 0 0 1 0 0 0 1 0 0 0 −1 0 0 0 0 0 0 0 −1 0 0 0 1 0 0 0 1 0 0 0].

For Option 2, the STF can be Defined in the Frequency Domain as:

Option 2: $PAR = 5.0685$ dB

[0 0 0 0 −1 0 0 0 −1 0 0 0 −1 0 0 0 −1 0 0 0 1

0 0 0 1 0 0 0 0 0 0 0 0 0 0 0 0 0 0 0 0 1 0

0 0 1 0 0 0 −1 0 0 0 −1 0 0 0 −1 0 0 0 −1 0 0

0]

-continued

[0 0 0 0 −1 0 0 0 1 0 0 0 −1 0 0 0 1 0 0 0 1

0 0 0 −1 0 0 0 0 0 0 0 0 0 0 0 0 0 0 0 −1 0

0 0 1 0 0 0 1 0 0 0 −1 0 0 0 1 0 0 0 −1 0 0

0]

[0 0 0 0 1 0 0 0 −1 0 0 0 1 0 0 0 −1 0 0 0 −1

0 0 0 1 0 0 0 0 0 0 0 0 0 0 0 0 0 0 0 1 0

0 0 −1 0 0 0 −1 0 0 0 1 0 0 0 −1 0 0 0 1 0 0

0]

[0 0 0 0 1 0 0 0 1 0 0 0 1 0 0 0 1 0 0 0 −1

0 0 0 −1 0 0 0 0 0 0 0 0 0 0 0 0 0 0 0 −1 0

0 0 −1 0 0 0 1 0 0 0 1 0 0 0 1 0 0 0 1 0 0

0].

These sequences are given in Matlab format. For Option 5, the first 0 represents the DC tone, which is not used. The next three subcarriers are 1, 2, and 3. In general, if there are N subcarriers, the Matlab subcarrier numbering is 0, 1, 2, 3, ..., (N/2)−1 followed by −(N/2), ..., −3, −2, −1. For Option 1, the STF can be defined in the frequency domain as:

Option 1: $PAR = 4.4012$ dB

[0 0 0 0 −1 0 0 0 −1 0 0 0 1 0 0 0 −1 0 0 0 −1

0 0 0 1 0 0 0 −1 0 0 0 −1 0 0 0 −1 0 0 0 1 0

0 0 1 0 0 0 1 0 0 0 0 0 0 0 0 0 0 0 0 0 0

0 0 0 0 0 0 0 0 0 0 0 0 0 0 0 0 0 1 0 0 0

1 0 0 0 1 0 0 0 −1 0 0 0 −1 0 0 0 −1 0 0 0 1

0 0 0 −1 0 0 0 −1 0 0 0 1 0 0 0 −1 0 0 0 −1 0

0 0]

[0 0 0 0 −1 0 0 0 1 0 0 0 1 0 0 0 1 0 0 0 −1

0 0 0 −1 0 0 0 −1 0 0 0 1 0 0 0 −1 0 0 0 −1 0

0 0 1 0 0 0 −1 0 0 0 0 0 0 0 0 0 0 0 0 0 0

0 0 0 0 0 0 0 0 0 0 0 0 0 0 0 0 0 −1 0 0 0

1 0 0 0 −1 0 0 0 −1 0 0 0 1 0 0 0 −1 0 0 0 −1

0 0 0 −1 0 0 0 1 0 0 0 1 0 0 0 1 0 0 0 −1 0

0 0]

[0 0 0 0 1 0 0 0 −1 0 0 0 −1 0 0 0 −1 0 0 0 1

0 0 0 1 0 0 0 1 0 0 0 −1 0 0 0 1 0 0 0 1 0

0 0 −1 0 0 0 1 0 0 0 0 0 0 0 0 0 0 0 0 0 0

0 0 0 0 0 0 0 0 0 0 0 0 0 0 0 0 0 1 0 0 0

−1 0 0 0 1 0 0 0 1 0 0 0 −1 0 0 0 1 0 0 0 1

0 0 0 1 0 0 0 −1 0 0 0 −1 0 0 0 −1 0 0 0 1 0

0 0]

[0 0 0 0 1 0 0 0 1 0 0 0 −1 0 0 0 1 0 0 0 1

0 0 0 −1 0 0 0 1 0 0 0 1 0 0 0 1 0 0 0 1 0

0 0 −1 0 0 0 −1 0 0 0 0 0 0 0 0 0 0 0 0 0 0

0 0 0 0 0 0 0 0 0 0 0 0 0 0 0 0 0 −1 0 0 0

−1 0 0 0 −1 0 0 0 1 0 0 0 1 0 0 0 1 0 0 0 −1

-continued 0 0 0 1 0 0 0 1 0 0 0 −1 0 0 0 1 0 0 0 1 0 0 0].

In at least one embodiment, the STF can be designed using rotated QPSK symbols. In another embodiment, the STF can be designed using rotated BPSK symbols. By having freedom in the design of the sequences, the PAR can be lowered for Option 1 and 2 easily on a case-by-case basis.

These sequences are given in Matlab format. For Option 5, the first 0 represents the DC tone, which is not used. The next three subcarriers are 1, 2, and 3. In general, if there are N subcarriers, the Matlab subcarrier numbering is 0, 1, 2, 3, ..., (N/2)−1 followed by −(N/2), ..., −3, −2, −1. An example of STFs using QPSK are:

Option 5: $PAR = 3.0103$ dB

[0 0 −$j$ 0 0 0 $j$ 0]

[0 0 $j$ 0 0 0 −$j$ 0];

Option 4: PAR=4.3983 dB
In addition to the 4 sequences for BPSK,

[0 0 −$j$ 0 −1 0 −$j$ 0 0 0 $j$ 0 −1 0 $j$ 0]

[0 0 −$j$ 0 1 0 −$j$ 0 0 0 $j$ 0 1 0 $j$ 0]

[0 0 $j$ 0 −1 0 $j$ 0 0 0 −$j$ 0 −1 0 −$j$ 0]

[0 0 $j$ 0 1 0 $j$ 0 0 0 −$j$ 0 1 0 −$j$ 0];

Option 3: $PAR = 4.3983$ dB

[0 0 0 0 −$j$ 0 0 0 −1 0 0 0 −$j$ 0 0 0 0 0 0 0 $j$ 0 0 0 −1 0 0 0 $j$ 0 0 0]

[0 0 0 0 −$j$ 0 0 0 1 0 0 0 −$j$ 0 0 0 0 0 0 0 $j$ 0 0 0 1 0 0 0 $j$ 0 0 0]

[0 0 0 0 $j$ 0 0 0 −1 0 0 0 $j$ 0 0 0 0 0 0 0 −$j$ 0 0 0 −1 0 0 0 −$j$ 0 0 0]

[0 0 0 0 $j$ 0 0 0 1 0 0 0 $j$ 0 0 0 0 0 0 0 −$j$ 0 0 0 1 0 0 0 −$j$ 0 0 0]

Option 2: $PAR = 4.2346$ dB

[0 0 0 0 −1 0 0 0 −$j$ 0 0 0 1 0 0 0 $j$ 0 0 0 1 0 0 0 −$j$ 0 0 0 0 0 0 0 0 0 0 0 0 0 0 $j$ 0 0 0 1 0 0 0 −$j$ 0 0 0 1 0 0 0 $j$ 0 0 0 −1 0 0 0]

[0 0 0 0 −1 0 0 0 $j$ 0 0 0 1 0 0 0 −$j$ 0 0 0 1 0 0 0 $j$ 0 0 0 0 0 0 0 0 0 0 0 0 0 0 −$j$ 0 0 0 1 0 0 0 $j$ 0 0 0 1 0 0 0 −$j$ 0 0 0 −1 0 0 0]

[0 0 0 0 1 0 0 0 −$j$ 0 0 0 −1 0 0 0 $j$ 0 0 0 −1 0 0 0 −$j$ 0 0 0 0 0 0 0 0 0 0 0 0 0 0 $j$ 0 0 0 −1 0 0 0 −$j$ 0 0 0 −1 0 0 0 $j$ 0 0 0 1 0 0 0]

[0 0 0 0 1 0 0 0 $j$ 0 0 0 −1 0 0 0 −$j$ 0 0 0 −1 0 0 0 $j$ 0 0 0 0 0 0 0 0 0 0 0 0 0 0 −$j$ 0 0 0 −1 0 0 0 $j$ 0 0 0 −1 0 0 0 −$j$ 0 0 0 1 0 0 0]

[0 0 0 0 −$j$ 0 0 0 −$j$ 0 0 0 −$j$ 0 0 0 −$j$ 0 0 0 $j$ 0 0 0 −$j$ 0 0 0 0 0 0 0 0 0 0 0 0 0 0 $j$ 0 0 0 −$j$ 0 0 0 $j$ 0 0 0 $j$ 0 0 0 $j$ 0 0 0 $j$ 0 0 0]

[0 0 0 0 −$j$ 0 0 0 $j$ 0 0 0 −$j$ 0 0 0 $j$ 0 0 0 $j$ 0 0 0 $j$ 0 0 0 0 0 0 0 0 0 0 0 0 0 0 −$j$ 0 0 0 −$j$ 0 0 0 −$j$ 0 0 0 $j$ 0 0 0 −$j$ 0 0 0 $j$ 0 0 0]

[0 0 0 0 $j$ 0 0 0 −$j$ 0 0 0 $j$ 0 0 0 −$j$ 0 0 0 −$j$ 0 0 0 −$j$ 0 0 0 0 0 0 0 0 0 0 0 0 0 0 $j$ 0 0 0 $j$ 0 0 0 $j$ 0 0 0 −$j$ 0 0 0 $j$ 0 0 0 −$j$ 0 0 0]

[0 0 0 0 $j$ 0 0 0 $j$ 0 0 0 $j$ 0 0 0 $j$ 0 0 0 −$j$ 0 0 0 $j$ 0 0 0 0 0 0 0 0 0 0 0 0 0 0 −$j$ 0 0 0 $j$ 0 0 0 −$j$ 0 0 0 −$j$ 0 0 0 −$j$ 0 0 0 −$j$ 0 0 0];

and

Option 1: $PAR = 3.7261$ dB

[0 0 0 0 $j$ 0 0 0 −$j$ 0 0 0 −$j$ 0 0 0 $j$ 0 0 0 $j$ 0 0 0 $j$ 0 0 0

-continued

−j 0 0 0 j 0 0 0 j 0 0 0 j 0 0 0 j 0 0 0 0 0 0 0 0 0 0 0 0 0 0 0

0 0 0 0 0 0 0 0 0 0 0 0 0 0 0 −j 0 0 0 −j 0 0 0 −j 0 0 0 −j 0 0 0 j 0 0 0 −j 0 0 0 j 0 0 0 −j 0 0 0 −j 0 0 0 j 0 0 0 j 0 0 0 −j 0 0 0].

These sequences are given in Matlab format. For Option 5, the first 0 represents the DC tone, which is not used. The next three subcarriers are 1, 2, and 3. In general, if there are N subcarriers, the Matlab subcarrier numbering is 0, 1, 2, 3, . . . , (N/2)−1 followed by −(N/2), . . . , −3, −2, −1. Some examples of LTFs using a rotated BPSK are:

Option 5: PAR = 4.3983 dB

[0 −1 −1 1 0 1 −1 −1]

[0 −1 1 1 0 1 1 −1]

[0 1 −1 −1 0 −1 −1 1]

[0 1 1 −1 0 −1 1 1];

Option 4: PAR = 4.1017 dB

[0 −1 −1 −1 1 1 −1 1 0 1 −1 1 1 −1 −1 −1]

[0 −1 1 −1 −1 1 1 1 0 1 1 1 −1 −1 1 −1]

[0 1 −1 1 1 −1 −1 −1 0 −1 −1 −1 1 1 −1 1]

[0 1 1 1 −1 −1 1 −1 0 −1 1 −1 −1 1 1 1];

Option 3: PAR = 4.1538 dB

[0 −1 −1 −1 −1 −1 1 −1 1 1 1 −1 −1 1 0 0 0 0 0 1 −1 −1 1 1 1 −1 1 −1 −1 −1 −1 −1]

[0 −1 1 −1 1 −1 −1 −1 −1 1 −1 −1 1 1 0 0 0 0 0 1 1 −1 −1 1 −1 −1 −1 −1 1 −1 1 −1]

[0 1 −1 1 −1 1 1 1 1 −1 1 1 −1 −1 0 0 0 0 0 −1 −1 1 1 −1 1 1 1 1 −1 1 −1 1]

[0 1 1 1 1 1 −1 1 −1 −1 −1 1 1 −1 0 0 0 0 0 −1 1 1 −1 −1 −1 1 −1 1 1 1 1 1];

Option 2: PAR = 4.4236 dB

[0 −1 −1 −1 −1 1 −1 1 −1 1 1 −1 1 1 −1 −1 1 −1 −1 −1

1 1 1 −1 −1 −1 −1 0 0 0 0 0 0 0 0 0 0 0 −1 −1 −1

−1 1 1 1 −1 −1 −1 1 −1 −1 1 1 −1 1 1 −1 1 −1 1 −1

−1 −1 −1]; and

Option 1 (100 data sub-carriers): PAR = 5.0478 dB

[0 1 1 −1 −1 1 1 −1 1 1 1 −1 1 1 −1 1 −1 1 −1 −1

−1 −1 −1 1 1 1 1 −1 −1 −1 1 −1 1 −1 −1 1 1 1 1 −1

−1 −1 1 −1 −1 −1 1 −1 −1 −1 −1 1 1 −1 1 0 0 0 0 0 0

0 0 0 0 0 0 0 0 0 0 0 0 1 −1 1 1 −1 −1 −1 −1

1 −1 −1 −1 1 −1 −1 −1 1 1 1 −1 −1 1 −1 1 −1 1 −1 −1 −1

1 1 1 1 −1 −1 −1 −1 −1 1 −1 1 −1 1 1 −1 1 1 1 −1 1

1 −1 −1 1 1]

Option 1 (96 data sub-carriers): PAR = 5.2695 dB

[0 1 −1 −1 1 1 −1 −1 1 1 −1 1 1 1 1 −1 1 −1 −1 −1

−1 −1 −1 1 1 1 1 1 −1 −1 1 1 −1 1 1 1 1 −1 −1 −1 −1 1 1

−1 −1 −1 −1 1 −1 −1 −1 −1 1 −1 −1 0 0 0 0 0 0 0 0 0

0 0 0 0 0 0 0 0 0 0 0 0 0 −1 −1 1 −1 −1 −1

-continued

```
-1  1 -1 -1 -1 -1  1  1 -1 -1 -1 -1  1  1  1 -1  1 -1 -1  1

1  1  1  1 -1 -1 -1 -1 -1 -1  1 -1  1  1  1  1 -1  1  1 -1

-1  1  1 -1 -1  1].
```

In at least one embodiment, a scaling factor is included to match the energy in the STF to the energy in the data symbols. For option 5, the STF can be scaled by sqrt(6/2) if there are 6 pilot+data subcarriers used for the data OFDM symbols while two sub-carriers are used for STF. Alternatively, the sub-carriers are scaled down in the data OFDM symbols to match the energy in the STF. Some examples of STFs including scaling factors are:

STF_freq(Option-1)=sqrt(104/24)*[0,zeros(1,3),j,zeros(1,3),-j, zeros(1,3),j,zeros(1,3),j,zeros(1,3),j,zeros(1,3),-j,zeros(1,3),j,zeros(1,3),-j, zeros(1,3),j,zeros(1,3),j,zeros(1,3),j, zeros(1,3),j,zeros(1,31),-j,zeros(1,3),-j,zeros(1,3),-j, zeros(1,3),-j,zeros(1,3),j,zeros(1,3),-j,zeros(1,3),j,zeros(1,3),-j, zeros(1,3),-j, zeros(1,3),j,zeros(1,3),j,zeros(1,3),-j,zeros(1,3)];

STF_freq(Option-2)=sqrt(52/12)*[0,zeros(1,3),-1,zeros(1,3),-j, zeros(1,3),1,zeros(1,3),j,zeros(1,3),1,zeros(1,3),-j,zeros(1,15),j,zeros(1,3),1,zeros(1,3),-j, zeros(1,3),1,zeros(1,3),j,zeros(1,3),-1,zeros(1,3)];

STF_freq(Option-3)=sqrt(26/6)*[0,zeros(1,3),-j,zeros(1,3),-1,zeros(1,3),-j, zeros(1,3),0,zeros(1,3),j,zeros(1,3),-1, zeros(1,3), j,zeros(1,3)];

STF_freq(Option-4)=sqrt(14/6)*[0,0,-j,0, -1,0,-j,0,0,0,j,0, -1,0,j,0]; and

STF_freq(Option-5)=sqrt(6/2)*[0,0,-j,0,0,0,j,0].

These sequences are given in Matlab format. For Option 5, the first 0 represents the DC tone, which is not used. The next three subcarriers are 1, 2, and 3. In general, if there are N subcarriers, the Matlab subcarrier numbering is 0, 1, 2, 3, . . . , (N/2)-1 followed by -(N/2), . . . , -3, -2, -1. Some examples of LTFs are:

LTF_freq(Option-1) = [0, 1, -1, -1, 1, 1, -1, -1, 1, 1, -1, 1, 1, 1, 1, -1,

1, -1, -1, -1, -1, -1, -1, 1, 1, 1, 1, -1, -1, 1, -1, 1, 1, 1, -1,

-1, -1, -1, 1, 1, -1, -1, -1, -1, 1, -1, -1, -1, -1, 1, -1, -1, zeros(1, 23), -1, -1, 1, -1, -1, -1, -1, 1, -1, -1, -1, -1, 1, 1,

-1, -1, -1, -1, 1, 1, 1, -1, 1, -1, -1, 1, 1, 1, 1, 1, -1, -1, -1,

-1, -1, -1, 1, -1, 1, 1, 1, 1, -1, 1, 1, -1, -1, 1, 1, -1, -1, 1];

LTF_freq(Option-2) = [0, -1, -1, -1, -1, 1, -1, 1, -1, 1,

1, -1, 1, 1, -1, -1, 1, -1, -1, -1, 1, 1, 1, -1, -1, -1,

-1, zeros(1, 11), -1, -1, -1, -1, 1, 1, 1, -1, -1, -1, 1,

-1, -1, 1, 1, -1, 1, 1, -1, 1, -1, 1, -1, -1, -1, -1];

LTF_freq(Option-3) = [0, -1, -1, -1, -1, -1, 1, -1, 1, -1, 1, 1, 1, -1,

-1, 1, zeros(1, 5), 1, -1, -1, 1, 1, 1, -1, 1, -1, -1, 1, -1, -1];

LTF_freq(Option-4) = [0, -1, -1, -1, 1, 1, -1, 1, zeros(1, 1), 1, -1, 1, 1, -1, -1, -1, -1];

and

LTF_freq(Option-5) = [0, -1, -1, 1, zeros(1, 1), 1, -1, -1].

An alternative example of a LTF using 100 data sub-carriers is:

LTF_freq(Option-1 alternative) = [0, 1, 1, -1, -1, 1, 1, -1, 1, 1, 1, -1, 1,

1, -1, 1, -1, 1, -1, -1, -1, -1, -1, 1, 1, 1, 1, -1, -1, -1, 1, -1, 1,

-1, -1, 1, 1, 1, 1, -1, -1, -1, 1, -1, -1, -1, 1, -1, -1, -1, -1, 1,

1, -1, 1, zeros(1, 19), 1, -1, 1, 1, -1, -1, -1, -1, 1, -1, -1, -1, 1,

-1, -1, -1, 1, 1, 1, 1, -1, -1, 1, -1, 1, -1, -1, -1, 1, 1, 1, 1, -1,

-1, -1, -1, -1, 1, -1, 1, 1, -1, 1, 1, 1, -1, 1, 1, -1, -1, 1, 1].

Figure 6:
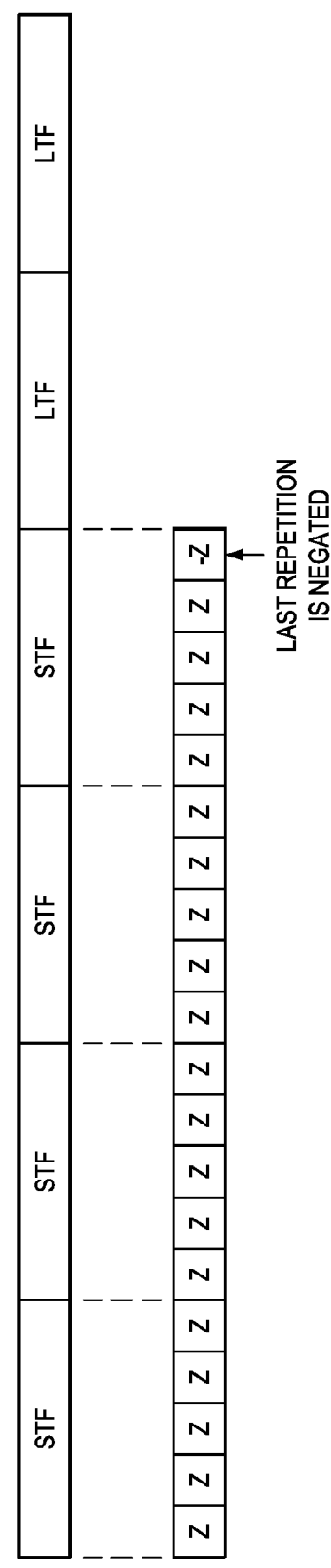
FIG. 6 illustrates negation of last STF to enable boundary detection in accordance with various embodiments.

In some embodiments, the preamble can be constructed to enable efficient boundary detection of the start of the OFDM packet. For example, FIG. 6 shows that a negation is applied for the last repetition in the STF. In at least one embodiment, the last repetition of a group of bits in the final STF is negated at the transmitter, and the receiver can use this information to determine when the sign change takes place so that the end of the STF can be determined accurately. Specifically, the output of a correlator shows a characteristic pattern at the boundary of the STF and LTF. In various embodiments, the last 2, 3, or N repetitions are negated. When cross-correlation is used (correlating against a known sequence), the transition that occurs from z to -z can be found by monitoring for a phase change of 180 degrees (in the noiseless case) in the correlator output. In FIG. 6, the "z" represents one group of bits repeated in the STF, which is itself repeated. In another embodiment, the entire final repeated STF is negated. In other embodiments, the size of the bits that are negated varies. Returning to FIG. 6, there are two OFDM symbols because the cyclic prefix is ¼ of the useful part of the OFDM symbol, and there is a repetition of 4 within the OFDM symbol due to the structure of the STF. Because the time-domain representation of the STF is real, any negative time-domain values for the last repetition are changed to positive and any positive time-domain values are changed to negative. In another embodiment the STF is complex, so the both the real and imaginary parts are negated for the last repetition within the last STF.

Figure 7:
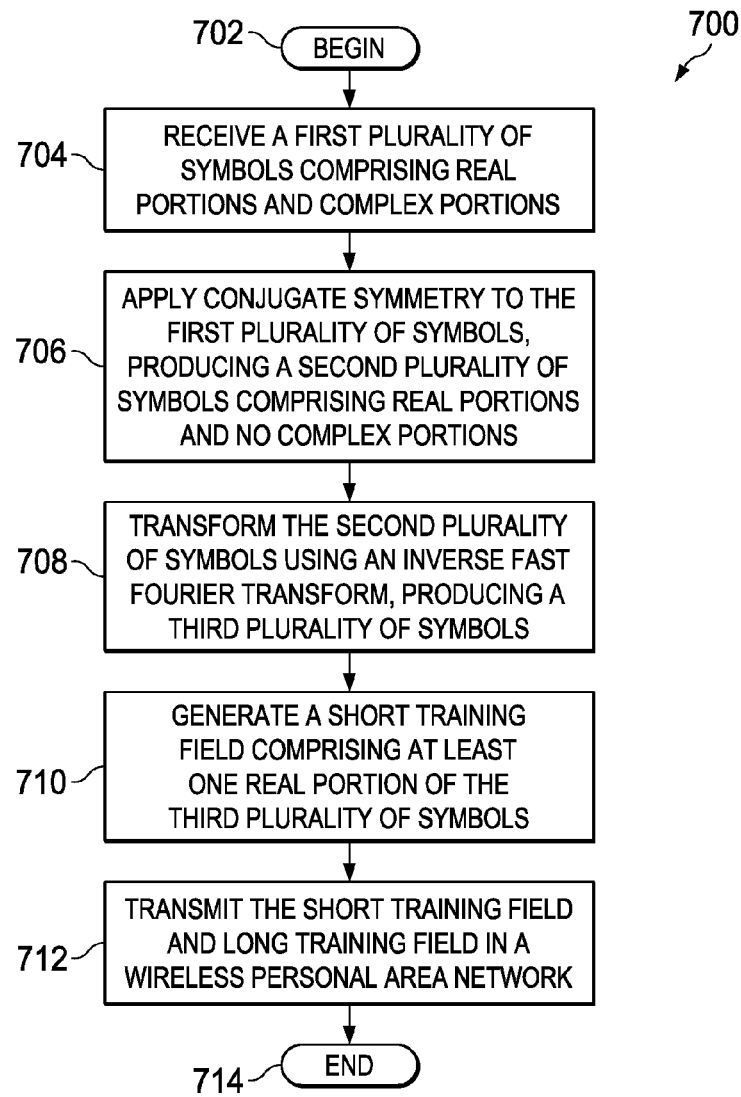
FIG. 7 illustrates a method of generating STFs and LTFs in accordance with various embodiments.

FIG. 7 illustrates a method of generating STFs and LTFs beginning at 702 and ending at 714. While at least one embodiment is illustrated, the method 700 can comprise any step described above in various embodiments. At 704, a first plurality of symbols comprising real portions and complex portions is received. At 706, conjugate symmetry is applied to the first plurality of symbols, thus producing a second plurality of symbols comprising real portions and no complex portions. At 708, the second plurality of symbols is transformed using an inverse fast Fourier transform, thus producing a third plurality of symbols. In at least one embodiment, the second plurality of symbols is interpolated. At 710, a short training field is generated comprising at least one real portion of the third plurality of symbols. At 712, a long training field is generated comprising at least one real portion of the third plurality of symbols. At 714, the short training field and long training field are transmitted in a wireless personal area network. In at least one embodiment, power is reduced to logic responsible for complex symbol processing. A final repetition of a group of bits is negated in at least one embodiment. Preferably, the last portion of the STF is negated. In an alternative embodiment the block 706 is omitted so that the STF and LTF are complex.

Figure 8:
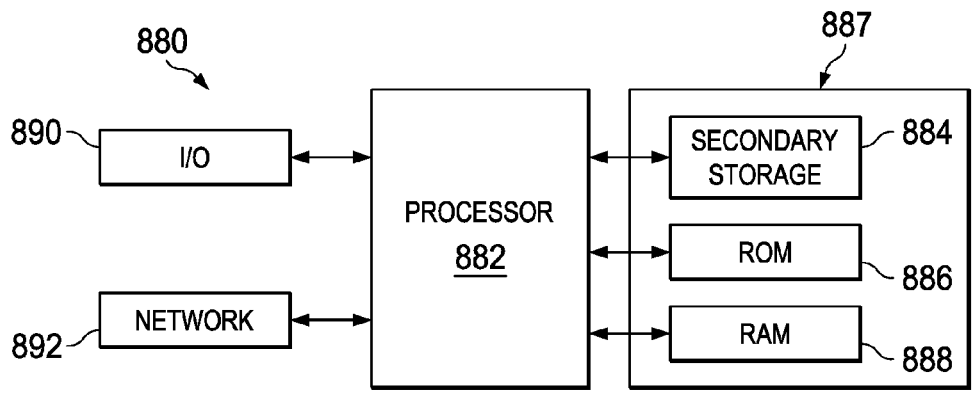
FIG. 8 illustrates a particular machine suitable for implementing one or more embodiments described herein.

The techniques described herein may be implemented on a particular machine with sufficient processing power, memory resources, and network throughput capability to handle the necessary workload placed upon it. FIG. 8 illustrates a particular machine 880 suitable for implementing one or more embodiments disclosed herein. The computer system 880 includes one or more processors 882 (which may be referred to as a central processor unit or CPU) in communication with a machine-readable medium 887. The machine-readable medium 887 may comprise memory devices including secondary storage 884, read only memory (ROM) 886, and random access memory (RAM) 888. The processor is further in communication with input/output (I/O) 890 devices and network connectivity devices 892. The processor may be implemented as one or more CPU chips.

The secondary storage 884 is typically comprised of one or more disk drives, tape drives, or optical discs and is used for non-volatile storage of data and as an over-flow data storage device if RAM 888 is not large enough to hold all working data. Secondary storage 884 may be used to store programs and instructions 889 that are loaded into RAM 888 when such programs are selected for execution. The ROM 886 is used to store instructions 889 and perhaps data, which are read during program execution. ROM 886 is a non-volatile memory device that typically has a small memory capacity relative to the larger memory capacity of secondary storage. The RAM 888 is used to store volatile data and perhaps to store instructions 889. Access to both ROM 886 and RAM 888 is typically faster than to secondary storage 884.

I/O 890 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 892 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 892 devices may enable the processor 882 to communicate with an Internet or one or more intranets. With such a network connection, the processor 882 may receive information from the network, or may output information to the network in the course of performing the above-described method steps. Such information, which is often represented as a sequence of instructions 889 to be executed using processor 882, may be received from and output to the network, for example, in the form of a computer data signal embodied in a carrier wave Such information, which may include data or instructions 889 to be executed using processor 882 for example, may be received from and output to the network, for example, in the form of a computer data baseband signal or signal embodied in a carrier wave. The baseband signal or signal embodied in the carrier wave generated by the network connectivity 892 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 882 executes instructions 889, codes, computer programs, scripts which it accesses from hard disk, floppy disk, optical disc (these various disk based systems may all be considered secondary storage 884), ROM 886, RAM 888, or the network connectivity devices 892.

In an alternative embodiment the system may be implemented in an application specific integrated circuit ("ASIC") comprising logic configured to perform any action described in this disclosure with corresponding and appropriate inputs and outputs or a digital signal processor ("DSP").

Figure 9:
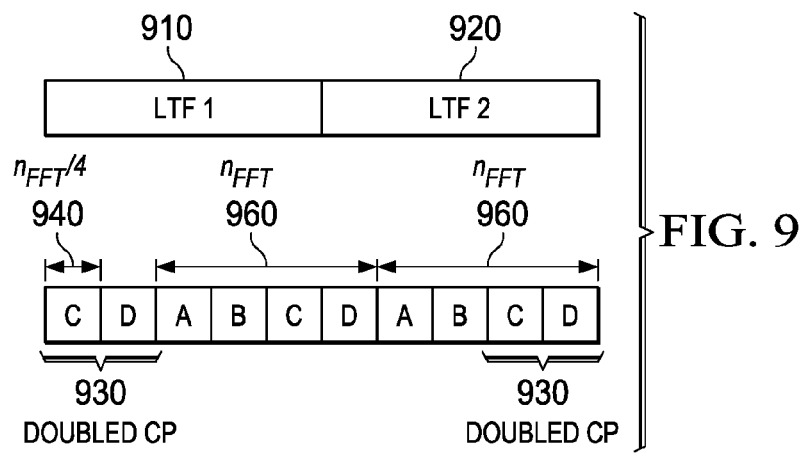
FIG. 9 illustrates LTF processing at a transmitter in accordance with various embodiments.
Figure 10:
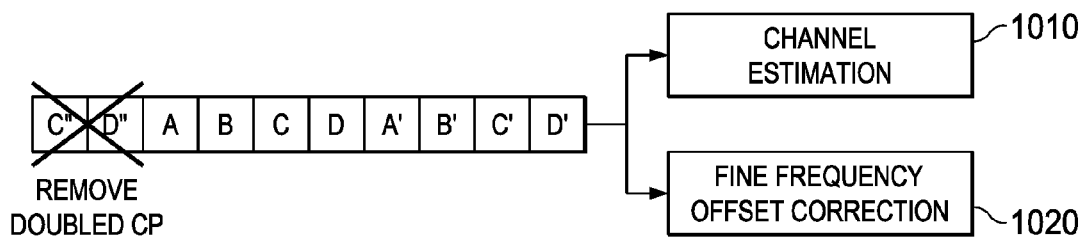
FIG. 10 illustrates LTF processing at a receiver in accordance with various embodiments.

FIG. 9 illustrates LTF processing at a transmitter and FIG. 10 illustrates LTF processing at a receiver in accordance with various embodiments. In FIGS. 9 and 10, the transmitter and receiver perform LTF processing to selectively boost the SNR of the LTF for channel estimation and fine frequency offset estimation. In FIG. 9, two LTF symbols, LTF1 910 and LTF2 920, are transmitted in time domain with doubled CP 930 for first LTF symbol 910 and no CP for second LTF symbol 920.

In FIG. 10, the doubled CP 930 is removed (after experiencing fading and additive noise at the channel) at the receiver and the two LTFs 910, 920 are processed by channel estimation block 1010 to estimate the channel. Similarly, in FIG. 10, the doubled CP 930 is removed at the receiver and the two LTFs 910, 920 are processed by a fine frequency offset correction block 1020 to estimate the fine frequency offset either in the time domain or in the frequency domain. The length of the base OFDM symbol excluding the cyclic prefix is nFFT 960.

When the delay spread is shorter than the CP length 940 (shown to be nFFT/4 in FIG. 9), removing the doubled CP 930 degrades the SNR inherent in the LTFs in the time domain. The purpose of the doubled CP 930 is to give robustness to timing errors. However, FFT placement becomes accurate as the operating SNR increases. The probability of the event that FFT placement is off more than nFFT/4 of the OFDM symbol is small at the normal operating SNR. Thus, in the normal operating SNR, at least the D" block in the double CP can be used to boost the SNR in the time domain. In general, part or all of C" and D" can be averaged in with the two full LTF symbols in order to improve the SNR, and the amount of C" and D" that is used can depend on the length of the channel impulse response. For a short channel more of the cyclic prefix can be used, and for a long channel impulse response less of the cyclic prefix can be used to improve channel estimation since it will be corrupted by multipath. For example, in a channel with no multipath (an AWGN channel or additive white Gaussian noise channel) all of "C" and "D" can be averaged in with the two full LTF symbols. If the channel impulse response occupies the length of the cyclic prefix, then "D" can be averaged in with the two full LTF symbols. If the channel impulse response is longer than the cyclic prefix length and there is some uncertainty in the symbol timing, then the receiver could use only the two full LTF symbols and not "C" or "D".

Figure 11:
FIG. 11 illustrates two LTF symbols in accordance with various embodiments.

FIG. 11 illustrates two LTF symbols 1110 from which the operating SNR is estimated by the receiver.

As shown in FIG. 12, one way to estimate the operating SNR is to take the difference between LTF 1230 [A B C D] and LTF 1240 [A' B' C' D'], and to calculate the energy in the difference signal and determine the sample mean 1250. In FIG. 12, D" is used to determine the sample mean 1250. In alternative scenarios (e.g., for a short channel impulse response), C" and D" may also be used to determine the sample mean 1250. In alternative scenarios (e.g., for long channel impulse response), neither D" nor C" are used to determine the sample mean 1250. The time placement uncertainty mostly occurs when the operating SNR is low. In FIG. 12, a fine frequency offset estimation in frequency domain is determined. Here, the fine frequency offset estimation is done in the frequency domain 1270 by virtue of the placement of FFT block 1260.

FIG. 13 illustrates time domain LTF processing at the receiver in accordance with an embodiment of the invention. In FIG. 12, D" is used to determine the sample mean 1250. In alternative scenarios (e.g., for a short channel impulse response), C" and D" may also be used to determine the sample mean 1250. In alternative scenarios (e.g., for long channel impulse response), neither D" nor C" are used to determine the sample mean 1250. The time placement uncertainty mostly occurs when the operating SNR is low. In FIG. 13, a fine frequency offset estimation in time domain 1370 is determined. Compared to averaging without the D" block, including the D" block as in FIG. 12 and FIG. 13 gives an additional SNR boost of the LTF by $$10\log_{10}\left(\frac{9}{8}\right) = 0.5\text{dB}.$$

FIG. 14 illustrates a wireless communication system 1400 in accordance with an embodiment of the invention. As shown, the wireless communication system 1400 comprises wireless communication devices 1402 and 1404 having logic to enable communications based on at least two long training field symbols having a doubled cyclic prefix as part of a synchronization header. More specifically, the wireless communication device 1402 comprises a transmitter 1404 and the wireless communication device 1410 comprises a receiver 1412. In alternative embodiments, the wireless communication device 1402 may comprise a receiver comparable to receiver 1412 and/or the wireless communication device 1410 may comprise a transmitter comparable to transmitter 1404.

In FIG. 14, the transmitter 1404 comprises synchronization header generator logic 1406 to generate a packet comprising at least two long training field symbols having a doubled cyclic prefix as part of a synchronization header. Meanwhile, the receiver 1412 comprises channel estimation logic to process the synchronization header and to vary an amount of the doubled cyclic prefix used for channel estimation. The receiver 1412 also comprises fine frequency offset estimation logic to process the synchronization header and to vary an amount of the doubled cyclic prefix used for fine frequency offset estimation. The receiver 1412 also comprises control logic 1418 to determine how much of the doubled cyclic prefix to use for channel estimation performed by the channel estimation logic 1414 and/or for fine frequency offset estimation performed by the fine frequency offset estimation logic 1416. In at least some embodiments, the control logic 1418 is configured to estimate a channel impulse response length and to vary the amount of the doubled cyclic prefix used for channel estimation or fine frequency offset estimation based on the estimated channel impulse response length. For example, the control logic 1418 may select to use a first amount of the doubled cyclic prefix corresponding to at least a D" block of the doubled cyclic prefix when the estimated channel impulse response length is less than a predetermined threshold. Further, the control logic 1418 may select to avoid usage of the doubled cyclic prefix for channel estimation or fine frequency offset estimation if the estimated channel impulse response length is more than a predetermined threshold. The logic components of wireless communication devices 1402 and 1410 may correspond to software executed by hardware, integrated circuits, or other pre-programmed or programmable components.

FIG. 15 illustrates a method 1500 in accordance with embodiments of the invention. The method 1500 may be performed, for example, by a receiving device configured to support communications based on at least two long training field symbols having a doubled cyclic prefix as part of a synchronization header. As shown, the method 1500 comprises receiving a long training symbol having a synchronization header with a doubled cyclic prefix at block 1502. The method 1500 also comprises varying an amount of the doubled cyclic prefix used for channel estimation at block 1504.

In at least some embodiments, the method 1500 may comprise additional or alternative steps. For example, the method 1500 may comprise comprises varying an amount of the doubled cyclic prefix used for fine frequency offset estimation. Further, the method 1500 may comprise estimating a channel impulse response length. The estimated channel impulse response length may be used to select the amount of the doubled cyclic prefix to be used for channel estimation or for fine frequency offset estimation. In some embodiments, the method 1500 may comprise selecting use of a first amount corresponding to at least a D" block of the doubled cyclic prefix when the estimated channel impulse response length is less than a predetermined threshold. Meanwhile, if the estimated channel impulse response length is more than the predetermined threshold, the method 1500 may avoid usage of the doubled cyclic prefix for channel estimation or fine frequency offset estimation.

The above disclosure is meant to be illustrative of the principles and various embodiment of the invention. Numerous variations and modifications will become apparent to those skilled in the art once the above disclosure is fully appreciated. Additionally, audio or visual alerts may be triggered upon successful completion of any action described herein, upon unsuccessful actions described herein, and upon errors. Also, the order of the actions shown in the FIG. 7 can be varied from order shown, and two or more of the actions may be performed concurrently. It is intended that the following claims be interpreted to embrace all variations and modifications.

What is claimed is:
1. A receiver comprising:
channel estimation logic configured to a process a long training field symbol having a doubled cyclic prefix, wherein the channel estimation logic is configured to vary an amount of the doubled cyclic prefix used for channel estimation;
fine frequency offset estimation logic configured to vary an amount of the doubled cyclic prefix used for fine frequency offset estimation; and
control logic configured to estimate a channel impulse response length and to vary the amount of the doubled cyclic prefix used for channel estimation or fine frequency offset estimation based on the estimated channel impulse response length.

2. The receiver of claim 1, wherein the control logic selects use a first amount of the doubled cyclic prefix when the estimated channel impulse response length is less than a predetermined threshold.

3. The receiver of claim 2, wherein the first amount corresponds to at least a D" block of the doubled cyclic prefix.

4. The receiver of claim 1, wherein the control logic is configured to avoid usage of the doubled cyclic prefix for channel estimation or fine frequency offset estimation if the estimated channel impulse response length is more than a predetermined threshold.

5. A wireless communication device comprising:
   logic to enable communications based on at least two long training field symbols having a doubled cyclic prefix as part of a synchronization header;
   wherein the logic comprises a receiving component configured to process the synchronization header and to vary an amount of the doubled cyclic prefix used for channel estimation;
   wherein the receiving component is further configured to vary an amount of the doubled cyclic prefix used for fine frequency offset estimation;
   wherein the receiving component is configured to estimate a channel impulse response length and to vary the amount of the doubled cyclic prefix used for channel estimation or fine frequency offset estimation based on the estimated channel impulse response length.

6. The wireless communication device of claim 5, wherein the receiving component is configured to select use of a first amount of the doubled cyclic prefix when the estimated channel impulse response length is less than a predetermined threshold.

7. The wireless communication device of claim 6, wherein the first amount corresponds to at least a D" block of the doubled cyclic prefix.

8. The wireless communication device of claim 5, wherein the receiving component is configured to avoid usage of the doubled cyclic prefix for channel estimation or fine frequency offset estimation if the estimated channel impulse response length is more than a predetermined threshold.

9. A method comprising:
   receiving a long training field symbol having a synchronization header with a doubled cyclic prefix;
   varying an amount of the doubled cyclic prefix used for channel estimations varying an amount of the doubled cyclic prefix used for fine frequency offset estimation; and
   estimating a channel impulse response length, wherein varying the amount of the doubled cyclic prefix used for channel estimation or fine frequency offset estimation is based on the estimated channel impulse response length.

10. The method of claim 9 further comprising selecting use of a first amount corresponding to at least a D" block of the doubled cyclic prefix when the estimated channel impulse response length is less than a predetermined threshold and avoiding usage of the doubled cyclic prefix for channel estimation or fine frequency offset estimation if the estimated channel impulse response length is more than the predetermined threshold.

* * * * *